March 8, 1960     G. C. TAUBE     2,927,373
POWER OPERATED PRUNING SHEARS
Filed March 30, 1959
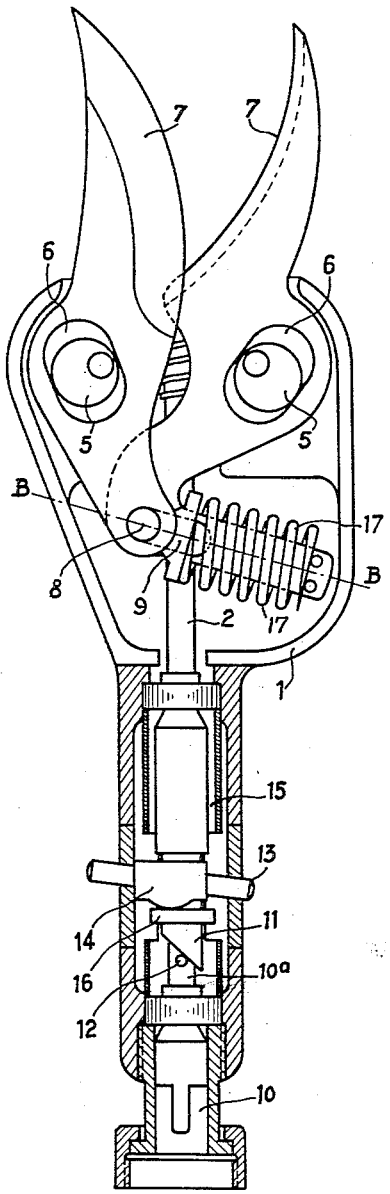
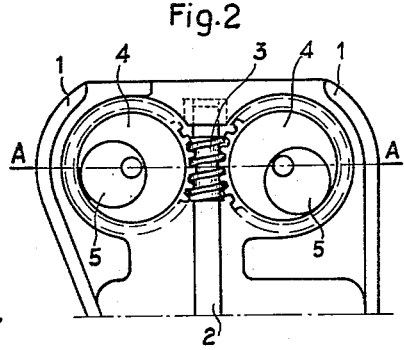
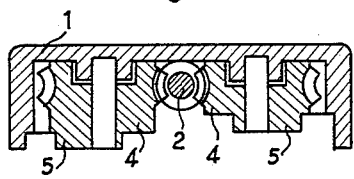
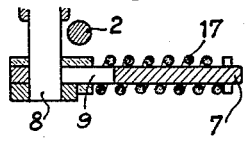
INVENTOR
GUSTAV C. TAUBE
BY Irwin S. Thompson
ATT.Y.

United States Patent Office 2,927,373
Patented Mar. 8, 1960

2,927,373

POWER OPERATED PRUNING SHEARS

Gustav C. Taube, Nimes, France

Application March 30, 1959, Serial No. 802,872

3 Claims. (Cl. 30—247)

The present invention relates generally to pruning shears or clippers and has more particular reference to power operated pruning shears of the type used for trimming trees or shrubs by lopping off superfluous branches or twigs especially fruit trees and vines and deriving their actuation from an externally located prime mover such as a small motor or engine connected to the input end of the shears by a flexible shaft.

An object of the invention is to provide new or improved pruning shears or clippers of the aforesaid type having cooperating blades so flexibly mounted and arranged as to be able to yield to a varying extent where an unduly hard object such as a twig of undue size or hardness is encountered as the clipping action takes place.

A further object of the invention is to provide improved pruning shears as aforesaid having readily accessible means permitting a very handy and easy manipulation by the operator grasping the shears handle between his fingers.

A still further object of the invention is to provide improved pruning shears as aforesaid made up of a minimum number of simple and sturdy parts lending themselves to cheap mass production and assembly.

With these and such other objects in view as will incidentally appear hereafter, the invention comprises the novel construction and combination of parts that will now be described with reference to the accompanying drawing exemplifying the same by way of illustration and forming a part of the present disclosure.

In the drawing:

Figure 1 is an elevational view partly in section of the improved pruning shears or clippers according to the invention, assuming the hollow handle of their body to be broken away for showing the mechanism housed therein.

Figure 2 is a fragmentary view of the actuating device for the worm gear which is not visible in Fig. 1 because it is hidden behind the cutting blades.

Figure 3 is a sectional view along the line A—A in Fig. 2.

Figure 4 is a sectional view along the line B—B in Fig. 1.

As shown, the improved pruning shears comprise a casing-like body 1 which may be constituted by a light metal or plastic casting made up of a pair of jointedly connected shell elements. Inside the body 1 is a shaft 2 connected to an external prime mover (not shown) such as a small motor or engine and terminating at its upper end (in the showing of Fig. 1) in a worm 3 which imparts rotation in reverse directions to a pair of worm gears 4 each one of which carries a cam or eccentric 5. The eccentrics 5 are housed for rotation in elongated slots 6 respectively formed in the cutting blades 7 of the shears.

The blades 7 are interconnected adjacent their lower ends (in the showing of Fig. 1) by a transverse axis 8 about which they can oscillate. In order to permit a certain amount of flexibility during the exertion of the cutting stress while staving off any risk of stalling of the prime mover (not shown) one of the blades 7 has an elongated aperture 9 through which the axis 8 passes. When the blades move to-and-fro to effect a normal cutting operation, said apertured blade is so held by a helical spring 17 that the blades normally oscillate without any shift about their interconnecting axis 8. However, if any resistance to the normal cutting motion of the blades is encountered e.g. owing to an unduly large or tough branch or twig to be cut, the apertured blade 7 slides off to a certain extent along the body 1 which initiates a lighter cutting operation during said sliding motion to the extent permitted by the length of the aperture 9 whereby cutting takes place say in two or three phases. If an insurmountable resistance is encountered, said action cannot take place and the only resource is for the operator to de-clutch the pruning shears from the prime mover.

The clutching means may be mechanically carried out in different fashions two of which are shown in the drawing.

According to a first constructional form, de-clutching of the power shaft is rendered possible by a dog tooth 11 engageable with a key member 12 rigid with the element 10a of the power shaft. A pusher member 13 engaged obliquely through the wall of the handle portion of the body 1 protrudes outside in the grasping region of the operator's fingers. This pusher member 13 is operatively connected with a cam-like core 14 adapted to shift the dog tooth 11 in the one or the other direction. Spring means may be provided for facilitating said shifting motion of the dog tooth 11. As the core 14 is operatively connected with the dog tooth 11, displacement of the pusher member 13 is sufficient for raising or lowering the dog tooth 11.

The operation is facilitated if the pusher member 13 is arranged adjacent the grasping position of the operator's thumb and forefinger.

Minor constructional details may be varied without departing from the subjoined claims.

What is claimed is:

1. Power operated pruning shears actuatable from an external prime mover and comprising a supporting body, a driving shaft journalled in said body and having one end projecting from said body and the other end terminating in a worm, connecting means on said projecting shaft end for linking the same with the prime mover, worm gears operatively connected to said worm, eccentrics carried by said worm gears, a pair of blades having cutting edges, a circular aperture in one of the blades, an elongated aperture in the other blade, a pivot engaged through said circular aperture and slidable through said elongated aperture, an elastic member holding said pivot adjacent one end of said elongated aperture, slots in said blades, the eccentrics being housed respectively in said slots for oscillating the blades about their pivot responsive to rotation of the driving shaft.

2. Pruning shears according to claim 1, wherein the slots in the blades extend between the pivot of the circular aperture and the elongated aperture and the cutting edges of the blades.

3. Power operated pruning shears actuatable from an external prime mover and comprising a supporting body, a driving shaft revolubly supported in said body and having an end projecting from said body, connecting means on said projecting shaft end for linking the same with the prime mover, a worm carried by said shaft, axes at right angles to said shaft and arranged on the opposite sides of said shaft, worm gears carried by said axes and meshing with said worm, eccentrics rigid with said gears, a pair of cutting blades, slots in said blades, said eccentrics being housed in said slots for oscillating the cutting blades as the driving shaft is rotated, a circular aperture in one of the blades, an elongated aperture in the other blade, a pivot engaged through said circular aperture and slidable through said elongated aperture, and elastic means normally holding said pivot adjacent one end of said elongated aperture.

References Cited in the file of this patent

UNITED STATES PATENTS

| | | |
|---|---|---|
| 178,500 | Wuterich | June 6, 1876 |
| 499,938 | Reynolds | June 20, 1893 |
| 1,551,179 | Stump et al. | Aug. 25, 1925 |
| 1,818,900 | MacNamee | Aug. 11, 1931 |
| 2,250,589 | LoPiccolo | July 29, 1941 |